(12) United States Patent  
Yosui

(10) Patent No.: US 9,576,238 B2  
(45) Date of Patent: Feb. 21, 2017

(54) ANTENNA DEVICE AND COMMUNICATION TERMINAL DEVICE

(71) Applicant: Murata Manufacturing Co., Ltd., Nagaokakyo-shi, Kyoto-fu (JP)

(72) Inventor: Kuniaki Yosui, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 258 days.

(21) Appl. No.: 14/219,066

(22) Filed: Mar. 19, 2014

(65) Prior Publication Data

US 2014/0203991 A1    Jul. 24, 2014

Related U.S. Application Data

(63) Continuation of application No. PCT/JP2013/051811, filed on Jan. 29, 2013.

(30) Foreign Application Priority Data

Feb. 1, 2012   (JP) ................................ 2012-019832  
Jul. 20, 2012  (JP) ................................ 2012-161127

(51) Int. Cl.
```
H01Q 7/00      (2006.01)
G06K 19/077    (2006.01)
H01Q 1/22      (2006.01)
```
(52) U.S. Cl.  
CPC ... *G06K 19/07783* (2013.01); *G06K 19/07749* (2013.01); *G06K 19/07794* (2013.01); *H01Q 1/2216* (2013.01); *H01Q 7/00* (2013.01)

(58) Field of Classification Search  
CPC ................................ G06K 19/077; H01Q 7/00  
(Continued)

(56) References Cited

U.S. PATENT DOCUMENTS

2007/0051807 A1   3/2007  Yamaguchi  
2008/0079644 A1   4/2008  Cheng  
(Continued)

FOREIGN PATENT DOCUMENTS

CN    101299486 A    11/2008  
CN    102037605 A    4/2011  
(Continued)

OTHER PUBLICATIONS

Official Communication issued in corresponding Japanese Patent Application No. 2013-556393, mailed on Nov. 4, 2014.  
(Continued)

*Primary Examiner* — Dameon E Levi  
*Assistant Examiner* — Andrea Lindgren Baltzell  
(74) *Attorney, Agent, or Firm* — Keating & Bennett, LLP

(57) ABSTRACT

An antenna device includes a planar conductor, a coiled antenna element, and a feed coil. The feed coil includes a coil conductor wound around a magnetic core. The planar conductor includes a ground conductor provided with a printed wiring substrate. In a portion of a circumferential portion of the planar conductor, a coupling portion is provided and defined by an aperture and a slit. In a planar view of the antenna element, at least a portion of the coil aperture of the feed coil and a portion of the aperture overlap with each other. In addition, at least a portion of the coil aperture of the feed coil and a portion of the coil aperture of the antenna element overlap with each other.

20 Claims, 14 Drawing Sheets

(58) Field of Classification Search
USPC .......................................................... 343/866
See application file for complete search history.

(56) References Cited

U.S. PATENT DOCUMENTS

| | | | | |
|---|---|---|---|---|
| 2009/0065594 | A1* | 3/2009 | Kato | G06K 19/07749 |
| | | | | 235/492 |
| 2011/0031320 | A1 | 2/2011 | Kato et al. | |
| 2011/0227799 | A1* | 9/2011 | Hashimoto | H01Q 1/2225 |
| | | | | 343/702 |
| 2012/0091821 | A1 | 4/2012 | Kato et al. | |
| 2012/0176282 | A1 | 7/2012 | Kato et al. | |
| 2012/0306714 | A1 | 12/2012 | Yosui et al. | |
| 2013/0050035 | A1 | 2/2013 | Kato et al. | |
| 2015/0122896 | A1 | 5/2015 | Kato et al. | |

FOREIGN PATENT DOCUMENTS

| | | |
|---|---|---|
| CN | 102280699 A | 12/2011 |
| CN | 103703473 A | 4/2014 |
| JP | 6-232626 A | 8/1994 |
| JP | 2004-357043 A | 12/2004 |
| JP | 2005-198047 A | 7/2005 |
| JP | 2005-352858 A | 12/2005 |
| JP | 4325621 B2 | 9/2009 |
| JP | 2011-199343 A | 10/2011 |
| JP | 2011-211611 A | 10/2011 |
| WO | 2009/142114 A1 | 11/2009 |
| WO | 2010/122888 A1 | 10/2010 |
| WO | 2011/062238 A1 | 5/2011 |
| WO | 2011/129151 A1 | 10/2011 |
| WO | 2011/135934 A1 | 11/2011 |

OTHER PUBLICATIONS

Official Communication issued in International Patent Application No. PCT/JP2013/051811, mailed on Apr. 16, 2013.
Official Communication issued in corresponding Chinese Patent Application No. 201380001743.4, mailed on Jul. 22, 2015.
Official Communication issued in corresponding Chinese Patent Application No. 201380001743.4, mailed on Oct. 16, 2014.

* cited by examiner

ANTENNA DEVICE AND COMMUNICATION TERMINAL DEVICE

BACKGROUND OF THE INVENTION

1. Field of the Invention

The present invention relates to an antenna device and a communication terminal device preferably for use in a communication system of an HF band or a UHF band.

2. Description of the Related Art

As a system for performing charging or article management, an RFID (Radio Frequency Identification) system has prevailed. In the RFID system, a reader/writer and an RFID tag are caused to wirelessly communicate with each other using a non-contact method, and high-frequency signals are transmitted and received between these devices. Each of the reader/writer and the RFID tag includes a wireless IC chip used for processing the high-frequency signal, and an antenna element used for transmitting and receiving the high-frequency signals. For example, in a HF-band RFID system utilizing a 13.56 MHz band, as the antenna element, a coiled antenna is used, and an antenna coil on a reader/writer side and an antenna coil on a tag side are coupled to each other through an induction magnetic field.

In this HF-band RFID system, for example, in a such a way as a FeliCa (registered trademark) compatible terminal illustrated in Japanese Patent No. 4325621, an antenna coil is embedded in a portable communication terminal and the communication terminal itself is used as a reader/writer or an RFID tag, in some cases. FIG. 15 is the longitudinal cross-sectional view of a contactless IC card reader/writer 1 described in Japanese Patent No. 4325621.

The contactless IC card reader/writer 1 includes an antenna substrate in which a loop antenna and a capacitor are provided in the top surface thereof, a control substrate 6 in which a transmission and reception circuit and a chip-type coil 5 are provided in the top surface thereof, a magnetic sheet 10 disposed between an antenna substrate 4 and the control substrate 6, and an insulating case 15. In order to form an aperture portion 11 above the chip-type coil 5 provided in the control substrate 6, the magnetic sheet 10 is disposed so as to avoid the upper side of the chip-type coil 5. As illustrated by a magnetic flux $\phi1$, the chip-type coil (feed coil) 5 is coupled to the loop antenna in the antenna substrate 4 through an induction magnetic field. As illustrated by a magnetic flux $\phi2$, the antenna substrate 4 is magnetic-field-coupled to an IC card 20. With this structure, without using a contact pin or a flexible cable, it is possible to substantially connect an RFID IC chip and an antenna coil to each other.

However, in recent years, with the functional enhancement and the miniaturization of communication terminals, it has become difficult to secure, within a terminal chassis, a sufficient space for disposing an antenna coil, a wireless IC chip, and a feed coil. For example, even though an antenna coil is disposed on one main surface side of a printed wiring substrate, there is not a space on this main surface side in some cases, the space being used for disposing the wireless IC chip and the feed coil. In this case, it is necessary to provide the wireless IC chip on the other main surface side of the printed wiring substrate and connect this wireless IC chip to the antenna coil provided on the one main surface side of the printed wiring substrate through a flexible cable or the like.

SUMMARY OF THE INVENTION

Preferred embodiments of the present invention provide an antenna device that increases the degree of freedom of a positional relationship between a feed circuit and a coiled antenna element and is able to be placed in a limited space, and a communication terminal device equipped therewith.

An antenna device according to a preferred embodiment of the present invention includes a planar conductor, a coiled antenna element, and a feed circuit coupled to the planar conductor or connected to the planar conductor, wherein the antenna element is disposed at a position at which the antenna element is coupled to the planar conductor through an electromagnetic field.

According to this configuration, the planar conductor defines and functions as a relaying element indirectly coupling the feed circuit and the antenna element to each other, the degree of freedom of a positional relationship between the feed circuit and the antenna element is high, and it is possible for the planar conduct to be located in a limited space.

It is preferable that a coupling portion of the planar conductor, to which the feed circuit is coupled, is an aperture or a cutout of the planar conductor. With this configuration, coupling between the feed circuit and the planar conductor and coupling between the feed circuit and the antenna element are increased.

It is preferable that the feed circuit includes a feed coil configured by a coil conductor wound so as to have a coil aperture therewithin and, in planar view, at least a portion of the coil aperture of the feed coil and a portion of the aperture of the planar conductor overlap with each other. With this configuration, coupling between the feed circuit and the planar conductor and coupling between the feed circuit and the antenna element are further increased.

It is preferable that the feed coil is integrated with an RFIC. With this configuration, it is not necessary to perform electrical conduction between the RFIC and the planar conductor using a wiring line in a substrate such as a printed wiring substrate, and the degree of freedom of a mounting space is increased.

It is preferable that the antenna element is a coil antenna configured by a conductor pattern wound so as to have a coil aperture therewithin and, in planar view, at least a portion of the coil aperture of the feed coil and a portion of the coil aperture of the coil antenna overlap with each other. With this configuration, coupling between the feed coil and the coil antenna is increased.

It is preferable that the antenna element is disposed at a position of the coupling portion. With this configuration, it is possible to increase a coupling efficiency between the antenna element and the planar conductor.

It is preferable that the antenna element is disposed at a position of an end portion of the planar conductor as necessary. With this configuration, it is possible to dispose the antenna element with a high degree of freedom.

It is preferable that the antenna element is disposed on both of a first main surface side and a second main surface side of the planar conductor as necessary. With this configuration, it is possible to cause the first main surface side and the second main surface side of the planar conductor to have the directivity of an antenna.

It is preferable that the antenna element is disposed at positions of a plurality of coupling portions of the planar conductor as necessary. With this configuration, it is possible to obtain an antenna device having directivities in a plurality of directions or an antenna device having a wide directivity.

It is preferable that the planar conductor is a ground conductor provided with a substrate and the feed circuit is provided with the substrate. With this configuration, it is not necessary to specially provide a planar conductor, and it is possible to easily apply to an electronic device including a substrate such as a printed wiring substrate.

It is preferable that the antenna element is provided on a first main surface side of the substrate and the feed circuit is provided on a second main surface side of the substrate. Since, With this configuration, it is possible to dispose the feed circuit and the antenna element with a substrate such as a printed wiring substrate caused to lie therebetween, it is possible to achieve space saving.

It is preferable that the antenna element has a resonant frequency corresponding to a carrier frequency of a communication signal. With this configuration, it is possible to achieve a high efficiency.

A communication terminal device according to another preferred embodiment of the present invention includes a substrate, a planar conductor provided with the substrate, a coiled antenna element, a feed circuit coupled to the planar conductor or connected to the planar conductor, and a chassis, wherein the planar conductor includes a coupling portion, an antenna device is included in which the antenna element is disposed at a position at which the antenna element is coupled to the planar conductor through an electromagnetic field generated by at least the coupling portion of the planar conductor, and the planar conductor is a ground conductor, the antenna element is provided in the chassis, the feed circuit is provided with the substrate, and a communication circuit connected to the feed circuit is provided with the substrate.

According to the above-mentioned structure, it is possible to configure a communication terminal device in which the degree of freedom of a positional relationship between a feed circuit and an antenna element is high and an antenna device is included in a limited space.

According to various preferred embodiments of the present invention, a planar conductor defines and functions as a relay antenna, and even if, within a terminal chassis, there is not a sufficient space to dispose a coiled antenna element and a feed circuit, in particular, even if it is necessary to individually dispose the feed circuit and the antenna element, for example, on the opposite sides of a printed wiring substrate, it is possible to supply a high-frequency signal from the feed circuit to the antenna element (or from the antenna element to the feed circuit).

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
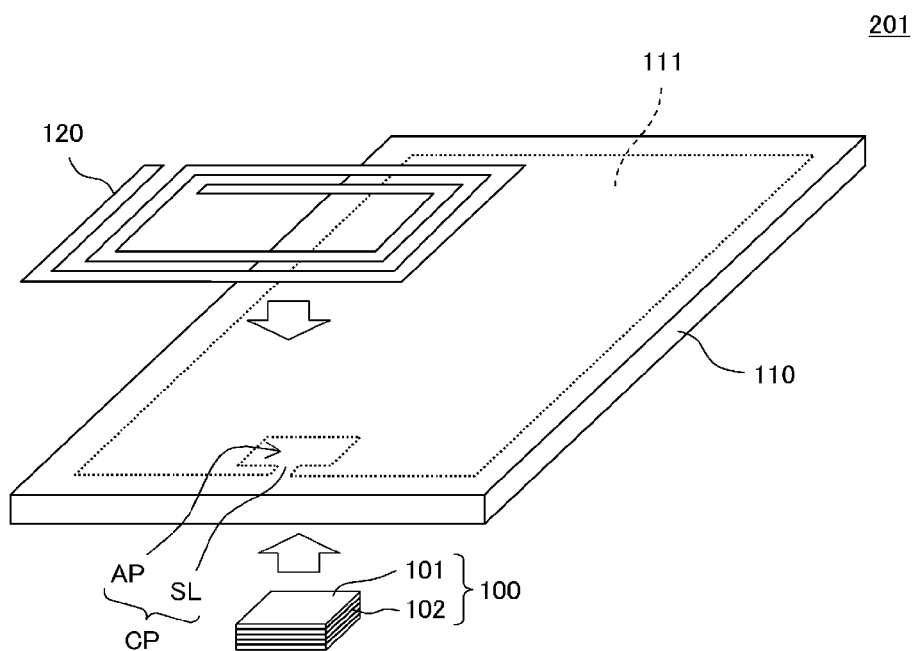
FIG. 1 is an exploded perspective view of an antenna device 201 according to a first preferred embodiment of the present invention.
Figure 2:
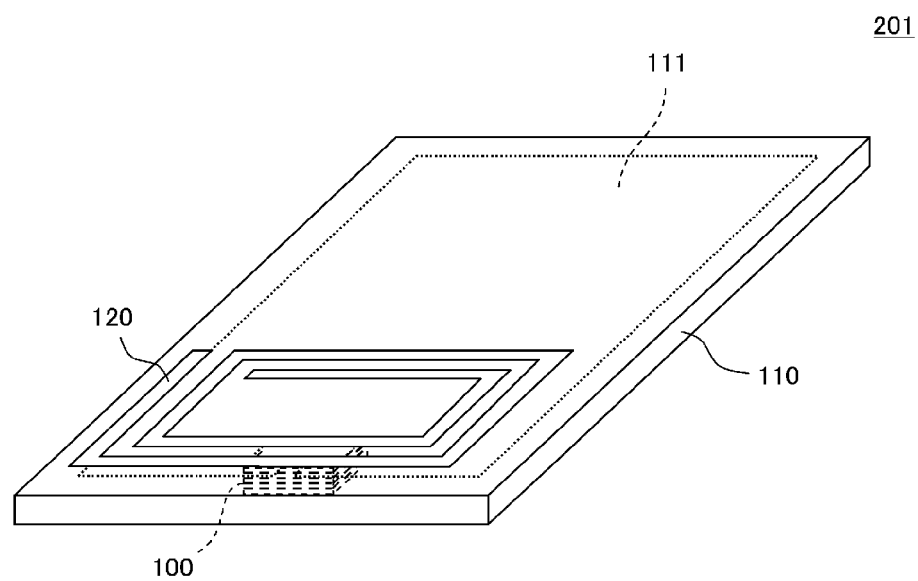
FIG. 2 is a perspective view of the antenna device 201.
Figure 3:
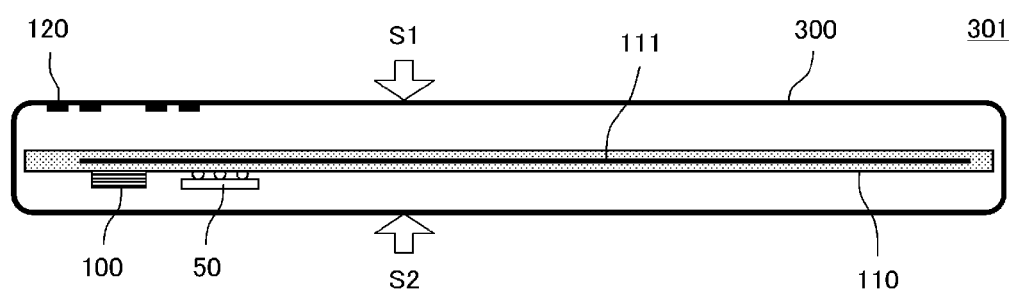
FIG. 3 is a cross-sectional view of a main portion of a communication terminal device including the antenna device 201.

FIG. 1 is the exploded perspective view of an antenna device 201 according to a first preferred embodiment, FIG. 2 is the perspective view of the antenna device 201, and FIG. 3 is the cross-sectional view of the main portion of a communication terminal device including the antenna device 201.

This antenna device 201 includes a planar conductor 111, a coiled antenna element 120, and a feed coil 100. The feed coil 100 has a structure in which a coil conductor 102 is wound around a magnetic core 101. The planar conductor 111 preferably is configured by a ground conductor provided within a printed wiring substrate 110. In a portion of the circumferential portion of the planar conductor 111, a coupling portion CP is provided and configured by an aperture AP and a slit SL. The antenna element 120 is a coil antenna configured by a conductor pattern wound in a spiral shape so as to have a coil aperture therewithin.

In this example, the aperture AP preferably is a rectangular or substantially rectangular portion in which no ground conductor is provided. The slit SL links the aperture AP to the outside of the planar conductor 111. In other words, the circumference of the aperture AP is not closed by the planar conductor 111.

The antenna element 120 is disposed at a position at which the antenna element is coupled to the planar conductor 111 through an electromagnetic field generated mainly by the coupling portion CP of the planar conductor 111. Specifically, in planar view, at least a portion of the coil aperture of the feed coil 100 and a portion of the aperture AP overlap with each other. In this example illustrated in FIG. 1, the center of the coil aperture of the feed coil 100 and the center of the aperture AP approximately coincide with each other.

In addition, in planar view, the antenna element 120 is disposed at a position at which at least a portion of the coil aperture (the inner portion of the coil conductor 102) of the feed coil 100 and a portion of the coil aperture of the antenna element 120 overlap with each other. In this example illustrated in FIG. 1, preferably the whole of the coil aperture of the feed coil 100 overlaps with the coil aperture of the antenna element 120.

As expressed in FIG. 3, a communication terminal device 301 includes a chassis 300 containing therewithin the printed wiring substrate 110. The first surface S1 of the chassis 300 is a bottom surface in a usual operating state. This first surface S1 faces toward an antenna on a communication partner side such as a reader/writer, and communication is performed. The second surface S2 of the chassis 300 is a surface on which a display panel or an operation panel is provided.

The antenna element 120 is directly disposed in the inner surface of the chassis 300 preferably by a printing method or various kinds of mold forming methods. The planar conductor 111 is provided in the inner layer of the printed wiring substrate 110, and doubles as the ground conductors of various kinds of circuits provided in the printed wiring substrate 110. The antenna element 120 is provided on the first main surface side (a top surface side in a state illustrated in FIG. 3) of the printed wiring substrate 110. In addition, the feed coil 100 is surface-mounted on the second main surface side (a bottom surface side in the state illustrated in FIG. 3) of the printed wiring substrate 110. An RFIC 50 is surface-mounted printed on the second main surface side of the printed wiring substrate 110. The RFIC 50 is connected to the feed coil 100 through a wiring line provided in the printed wiring substrate 110. The RFIC 50 preferably is a wireless IC chip, and includes a memory circuit and a signal processing circuit. The RFIC 50 may also be a bare chip or a package IC.

While not illustrated, other electronic circuit components such as, for example, a liquid crystal drive circuit and a power supply circuit preferably are mounted in the printed wiring substrate 110.

Figure 4A:
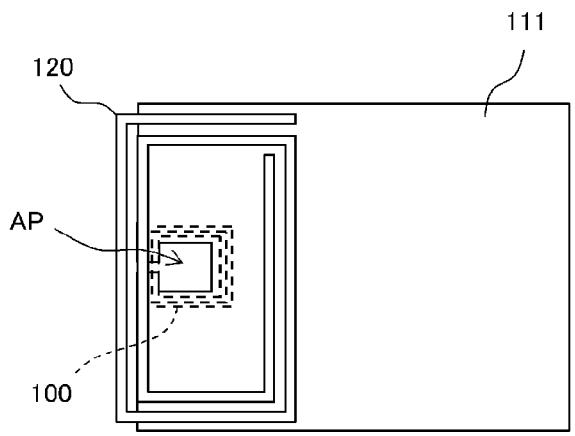
FIG. 4A is a diagram illustrating a positional relationship between a feed coil 100, an aperture AP of a coupling portion of a planar conductor 111, and an antenna element 120 in planar view.
Figure 4B:
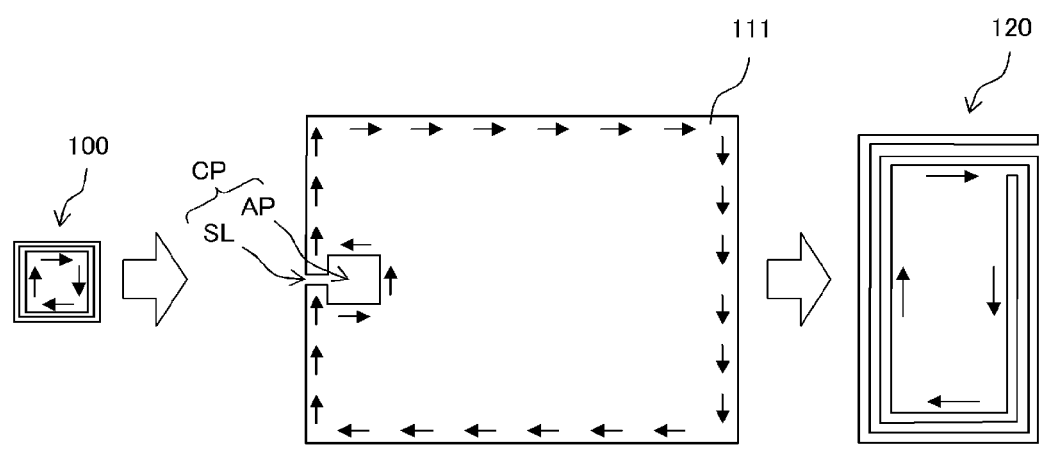
FIG. 4B is a diagram illustrating situations of currents flowing through the feed coil 100, the planar conductor 111, and the antenna element 120.

FIG. 4A is a diagram illustrating a positional relationship between the feed coil 100, the aperture AP of the coupling portion of the planar conductor 111, and the antenna element 120 in planar view. FIG. 4B is a diagram illustrating the situations of currents flowing through the feed coil 100, the planar conductor 111, and the antenna element 120.

As illustrated in FIG. 4A, at least a portion of the aperture AP of the coupling portion of the planar conductor 111 and a portion of the coil aperture of the feed coil 100 overlap with each other, and at least a portion of the aperture AP of the coupling portion of the planar conductor 111 and a portion of the coil aperture of the antenna element 120 overlap with each other. As a result, the feed coil 100, the aperture AP of the coupling portion, and the antenna element 120 are coupled to each other through an electromagnetic field.

As illustrated in FIG. 4B, when a signal current flows through the feed coil 100, an induced current flows so as to circle around the outside edge portion of the planar conductor 111, through the aperture AP and the slit SL of the planar conductor 111. In addition, the induced current of the current flowing through the planar conductor 111 flows through the antenna element 120. As a result, a wireless signal is sent to the antenna coil on the communication partner side through an electromagnetic field.

The planar conductor 111 is sufficiently larger than the feed coil 100. The antenna element 120 may have the same size as the planar conductor 111 and may also be smaller than the planar conductor 111.

Figure 5:
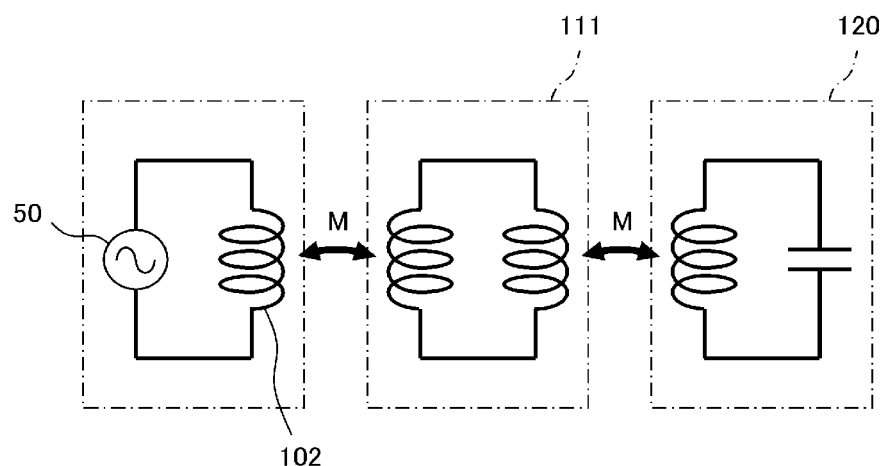
FIG. 5 is an equivalent circuit diagram of the antenna device 201 according to the first preferred embodiment of the present invention.

FIG. 5 is the equivalent circuit diagram of the antenna device 201 according to the first preferred embodiment. The RFIC 50 and the coil conductor 102 of the feed coil define and function as a feed circuit for the planar conductor 111.

The planar conductor 111 is magnetic-field-coupled to the coil conductor 102 of the feed coil, and the planar conductor 111 is also magnetic-field-coupled to the antenna element 120. In this way, the planar conductor 111 defines and functions as an antenna relaying coupling between the coil conductor 102 of the feed coil and the antenna element 120. In addition, the planar conductor 111 also functions as a radiator. Furthermore, the above-mentioned feed circuit configured by the RFIC 50 and the coil conductor 102 of the feed coil also defines and functions as a radiator.

Second Preferred Embodiment

Figure 6A:
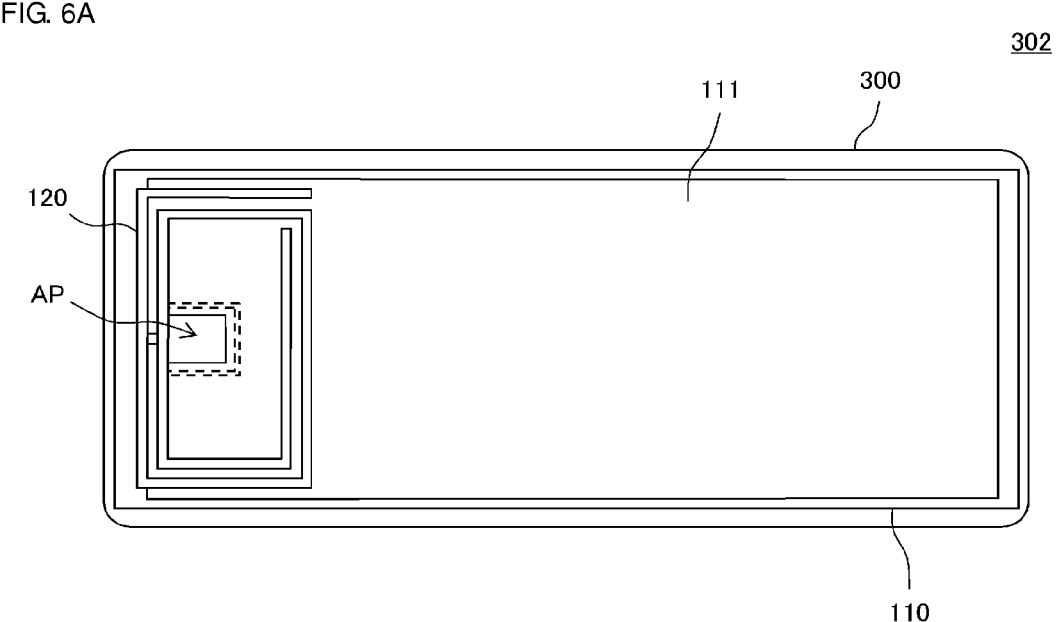
FIG. 6A is a plan view of a communication terminal device 302 according to a second preferred embodiment of the present invention.
Figure 6B:
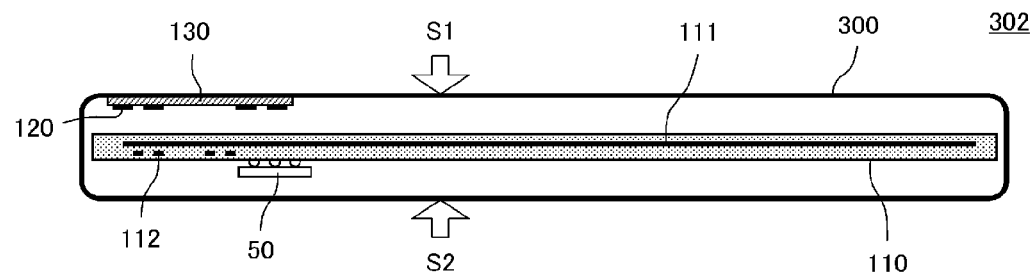
FIG. 6B is a cross-sectional view of a main portion of the communication terminal device 302.

FIG. 6A is the plan view of a communication terminal device 302 according to a second preferred embodiment of the present invention. In this regard, however, the first surface S1 side of the chassis of the communication terminal device is illustrated in a see-through state. FIG. 6B is the cross-sectional view of the main portion of the communication terminal device 302.

In a way different from the first preferred embodiment, the coiled antenna element 120 is provided on a base material film 130 and defined by a conductor pattern. The base material film 130 including this antenna element 120 is pasted on the inner surface of the chassis 300 of the communication terminal device 302 preferably via a double-stick tape or the like. According to this structure, the degrees of freedom of the material of the chassis 300 and a processing method therefor are high.

In addition, in a way different from the first preferred embodiment, the feed coil 112 is integrally formed in the inner layer of the printed wiring substrate 110. According to this structure, a feed coil as a component becomes unnecessary, and it is possible to achieve space saving. In addition, since it is possible to form the feed coil 112 in the same process as the planar conductor (ground conductor) 111, it becomes unnecessary to mount the feed coil to the printed wiring substrate, it is possible to achieve cost reduction.

Third Preferred Embodiment

Figure 7:
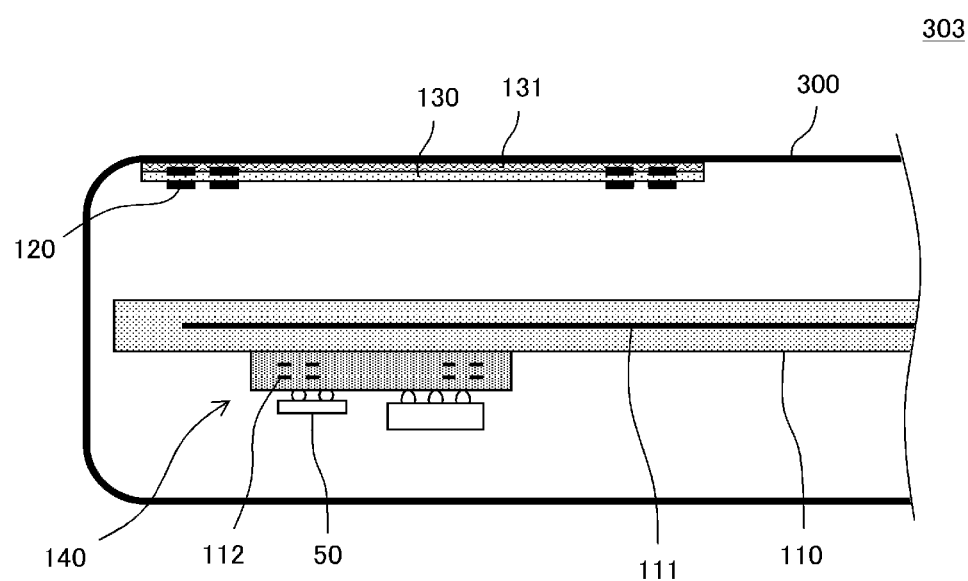
FIG. 7 is a cross-sectional view of a main portion of a communication terminal device 303 according to a third preferred embodiment of the present invention.

FIG. 7 is the cross-sectional view of the main portion of a communication terminal device 303 according to a third preferred embodiment of the present invention. In this example, a high-frequency circuit module 140 is mounted on the printed wiring substrate 110. A matching circuit (not shown) preferably is provided in a multilayer substrate in which the feed coil 112 is provided in the high-frequency circuit module 140, chip components such as the RFIC 50 and a secure element IC are mounted thereon, and hence, this high-frequency circuit module 140 is configured. At the position of the planar conductor 111 corresponding to the mounting position of the high-frequency circuit module 140, an aperture and a slit are formed in the same way as the first or second preferred embodiment.

The coiled antenna element 120 is provided on the both surfaces of the base material film 130, and the base material film with the antenna element is pasted on the inner surface of the chassis 300 through an adhesive layer 131.

Figure 8A:
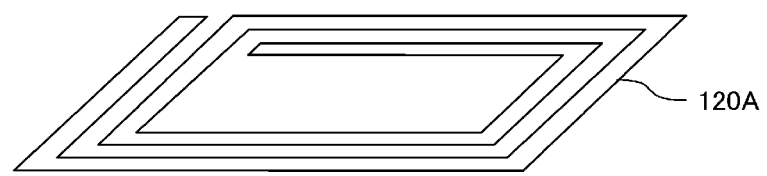
FIG. 8A is a perspective view drawn with coil conductors 120A and 120B in the antenna element 120 isolated.
Figure 8A:
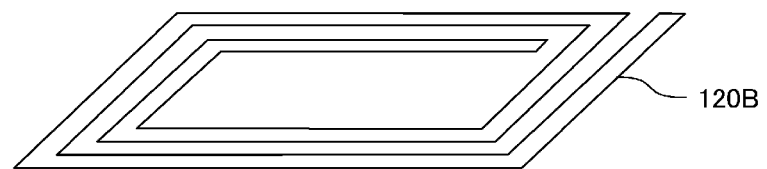
Figure 8B:
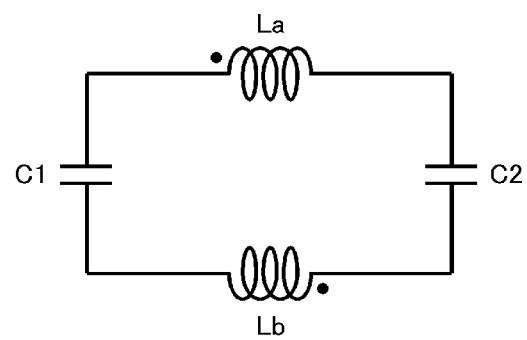
FIG. 8B is an equivalent circuit diagram of the antenna element 120.

FIG. 8A is a perspective view drawn with coil conductors 120A and 120B in the above-mentioned antenna element 120 isolated. FIG. 8B is the equivalent circuit diagram of the antenna element 120.

The rectangular or substantially rectangular spiral-shaped coil conductor 120A provided on the top surface of the base material film 130 and the rectangular or substantially rectangular spiral-shaped coil conductor 120B provided on the bottom surface of the base material film 130 are arranged so that the coil conductors face each other, and arranged so that the winding directions thereof become directions opposite to each other (the same direction in planar view from one).

In FIG. 8B, inductors La and Lb correspond to the above-mentioned rectangular or substantially rectangular spiral-shaped coil conductors 120A and 120B. Since the rectangular or substantially rectangular spiral-shaped coil conductors 120A and 120B face each other through the base material film, capacitance occurs between the two. Capacitors C1 and C2 in FIG. 8B express the capacitance. In this way, due to the inductors La and Lb and the capacitors C1 and C2, the antenna element 120 defines and functions as an LC resonant circuit. The resonant frequency thereof coincides with or is near the carrier frequency of a communication signal.

Fourth Preferred Embodiment

Figure 9:
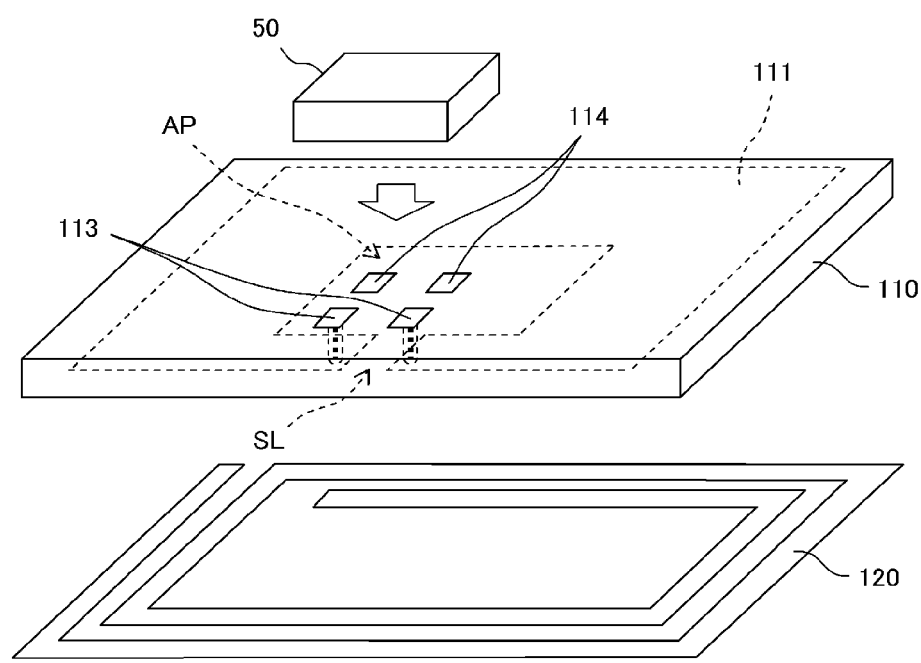
FIG. 9 is an exploded perspective view of an antenna device 202 according to a fourth preferred embodiment of the present invention.

FIG. 9 is the exploded perspective view of an antenna device 202 according to a fourth preferred embodiment of the present invention. This antenna device 202 includes the planar conductor 111 and the coiled antenna element 120. In this example, the planar conductor 111 is provided in the inner layer of the printed wiring substrate 110, and on the outer surface thereof, an input-output connection electrode 113 and a NC (not-electrically-connected and mounting) connection electrode 114 are provided. The planar conductor 111 is a ground conductor, and includes the aperture AP and the slit SL in the same way as each preferred embodiment illustrated above. The input-output connection electrode 113 is connected, through a via conductor, to the position (a position straddling the slit SL) of the planar conductor 111, isolated by the slit SL.

The RFIC 50 is mounted on the input-output connection electrode 113 and the NC connection electrode. The RFIC 50 is a feed circuit for the planar conductor 111, and also includes a matching circuit.

In this way, the RFIC 50 is mounted on the printed wiring substrate 110, and is directly connected to the coupling portion of the planar conductor 111. In this case, the aperture AP and the slit SL provided in the planar conductor 111 define and function, due to the inductance components thereof, as a matching circuit between a circuit within the RFIC 50 and the planar conductor 111.

Fifth Preferred Embodiment

In a fifth preferred embodiment of the present invention, another shape of the coupling portion of the planar conductor 111 and an example of a positional relationship between the coupling portion and a feed coil will be illustrated.

Figure 10A:
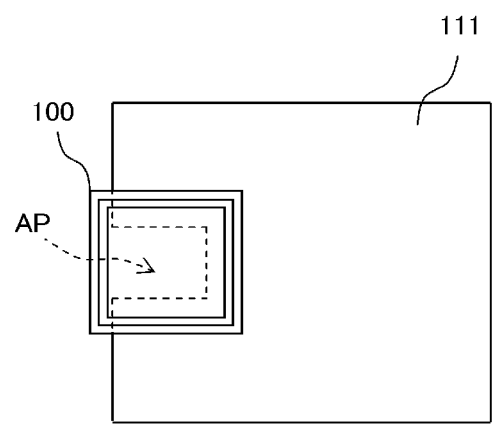
FIG. 10A and FIG. 10B are plan views of a planar conductor 111 and a feed coil in an antenna device according to the fifth preferred embodiment of the present invention.
Figure 10B:
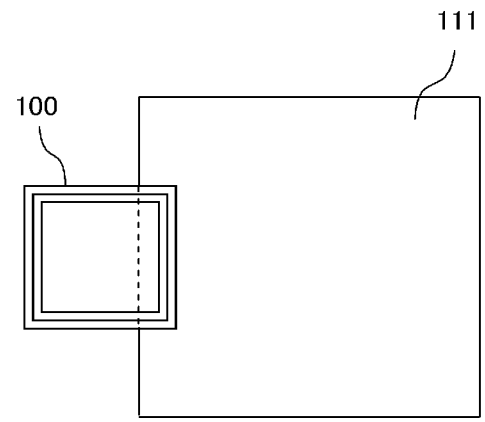

Both FIG. 10A and FIG. 10B are the plan views of the planar conductor 111 and the feed coil in an antenna device according to the fifth preferred embodiment. In the example in FIG. 10A, in a portion of the circumferential portion of the planar conductor 111, a cutout-shaped aperture AP is formed. In particular, no slit exists, and one side of the four sides of this aperture AP is opened to the outside. This aperture AP is a coupling portion with the feed coil 100. In the example in FIG. 10B, in particular, no aperture and no slit exist in the planar conductor 111, and the planar conductor 111 and the feed coil 100 are disposed so that a portion of the feed coil 100 overlaps with a predetermined position of the circumferential portion of the planar conductor 111 in planar view. Within the planar conductor 111, a portion with which the feed coil 100 overlaps in planar view is a coupling portion.

The coiled antenna element is disposed at a position at which the antenna element is coupled to the planar conductor 111 through an electromagnetic field generated by the coupling portion of the planar conductor 111. In FIGS. 10A and 10B, the illustration of the antenna element is omitted.

In this way, even in the coupling portion with no slit or the coupling portion with no aperture, the feed coil 100 is electromagnetic-field-coupled to the planar conductor 111, and in the same way as in FIG. 4B, a current flows through the circumferential portion of the planar conductor 111. Accordingly, the planar conductor 111 relays coupling between the feed coil 100 and the antenna element.

Sixth Preferred Embodiment

Figure 11A:
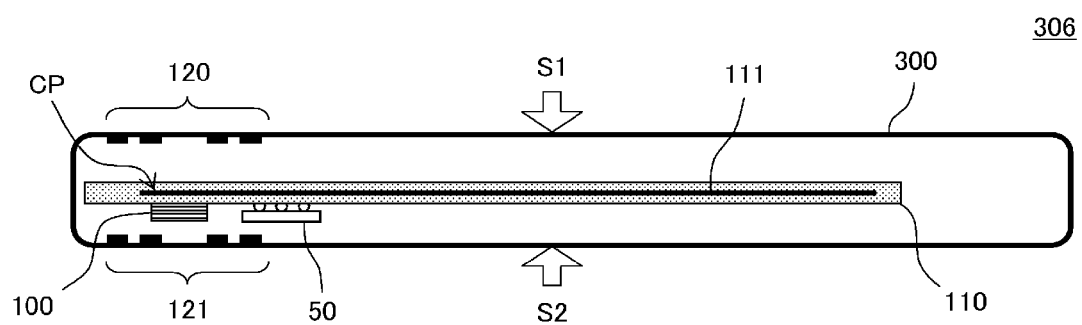
FIG. 11A is a cross-sectional view of a main portion of a communication terminal device 306 according to a sixth preferred embodiment of the present invention.
Figure 11B:
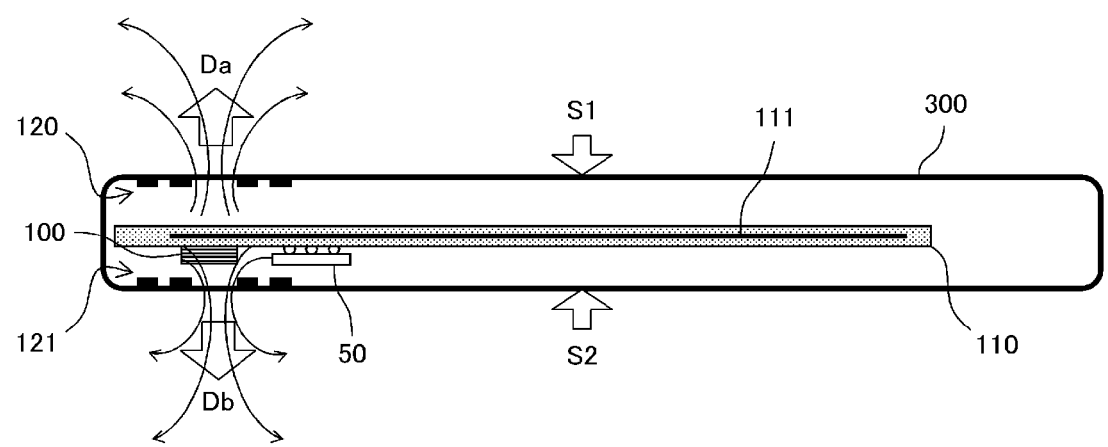
FIG. 11B is a diagram schematically illustrating a situation of magnetic fluxes occurring in the vicinity of an antenna element in an antenna device 306.

FIG. 11A is the cross-sectional view of the main portion of a communication terminal device 306 according to a sixth preferred embodiment of the present invention. FIG. 11B is a diagram schematically illustrating the situation of magnetic fluxes occurring in the vicinity of an antenna element in an antenna device 306.

This sixth preferred embodiment includes two coiled antenna elements 120 and 121. The antenna elements 120 and 121 are disposed at positions at which they are coupled to the planar conductor 111 through an electromagnetic field generated mainly to the coupling portion CP of the planar conductor 111. The antenna element 120 is provided on the first surface S1 side of the chassis 300. The antenna element 121 is provided on the second surface S2 side of the chassis 300.

The configuration of the antenna element 121 is preferably the same as the antenna element 120 illustrated in each preferred embodiment. The whole configuration other than the antenna element 121 is preferably the same as the antenna device 301 illustrated in the first preferred embodiment.

As expressed in FIG. 11B, due to the antenna element 120, directivity in an arrow Da direction occurs, and due to the antenna element 121, directivity in an arrow Db direction occurs. Accordingly, even if either one of both surfaces of the chassis 300 faces toward the antenna of a communication partner, it is possible to secure a large maximum communicatable distance. In addition, since a gain in the vicinity of one end portion of the chassis 300 is high, it is possible to use this portion as a so-called hot spot.

Seventh Preferred Embodiment

Figure 12A:
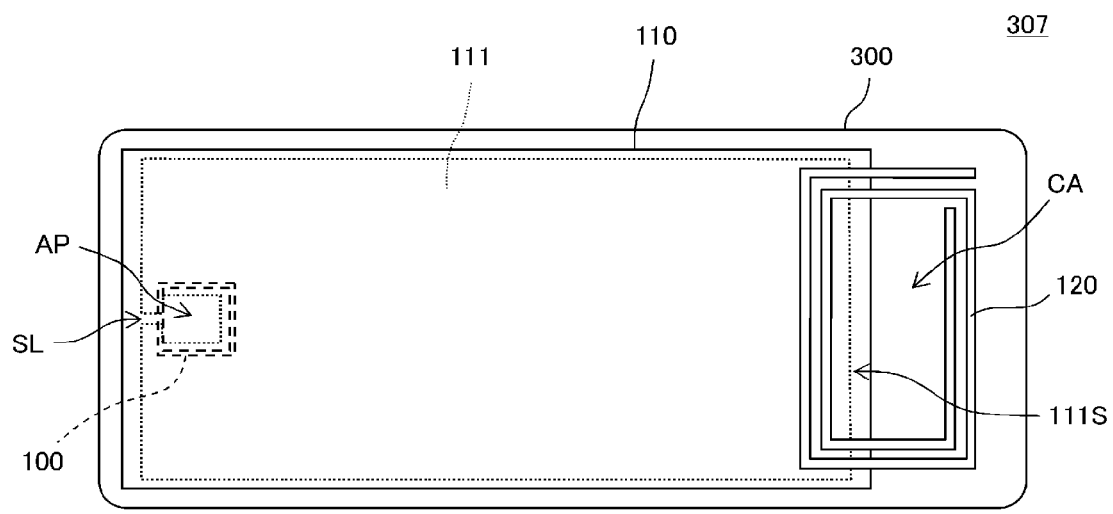
FIG. 12A is a plan view of a communication terminal device 307 according to a seventh preferred embodiment of the present invention.
Figure 12B:
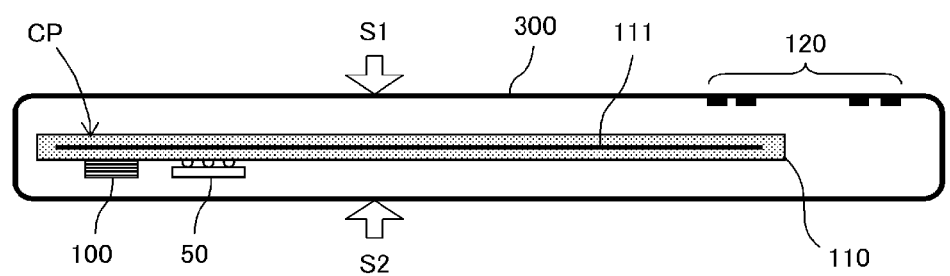
FIG. 12B is a cross-sectional view of a main portion of the communication terminal device 307.

FIG. 12A is the plan view of a communication terminal device 307 according to a seventh preferred embodiment of the present invention. In this regard, however, the first surface (S1 side) of the chassis of the communication terminal device is illustrated in a see-through state. FIG. 12B is the cross-sectional view of the main portion of the communication terminal device 307.

In a way different from the first preferred embodiment, the coiled antenna element 120 is not disposed at the position of the coupling portion CP but is disposed at the position of an end portion (the side of the planar conductor, located far away from the coupling portion CP) of the planar conductor 111. The antenna element 120 is disposed so that an end portion (the side of the planar conductor, located far away from the coupling portion CP) 111S of the planar conductor 111 falls within the coil aperture CA of the antenna element 120. Therefore, a portion of magnetic fluxes occurring in the vicinity of the end edge of the planar conductor 111 is interlinked with the antenna element 120. In other words, the antenna element 120 is coupled to the planar conductor 111.

In addition, if the end portion 111S of the planar conductor 111 falls within the coil aperture (coil inner circumference region) CA of the antenna element 120, a magnetic coupling amount between the antenna element 120 and the planar conductor 111 becomes large, and hence, it is preferable. However, this relationship is not necessarily adopted, and in a positional relationship in which a portion of magnetic fluxes occurring in the vicinity of the end edge of the planar conductor 111 is interlinked with the antenna element 120, the antenna element 120 is coupled to the planar conductor 111.

The other configuration is preferably the same as the antenna device illustrated in the first preferred embodiment. According to this preferred embodiment, strong directivity is obtained in the first surface S1 direction of the chassis 300 in the vicinity of the antenna element 120 in the chassis 300. In addition, according to this structure, since it is possible to dispose the antenna element 120 regardless of the position of the feed coil 100, the degree of freedom of the disposition position of the antenna element 120 with respect to the printed wiring substrate 110 is high.

Eighth Preferred Embodiment

Figure 13A:
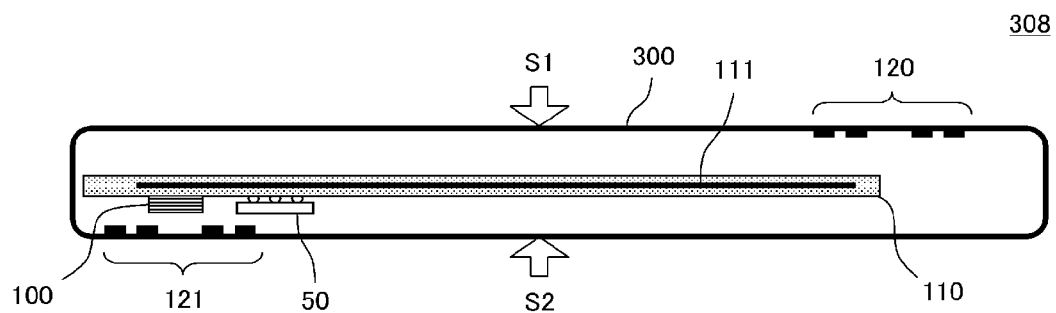
FIG. 13A is a cross-sectional view of a main portion of a communication terminal device 308 according to an eighth preferred embodiment of the present invention.
Figure 13B:
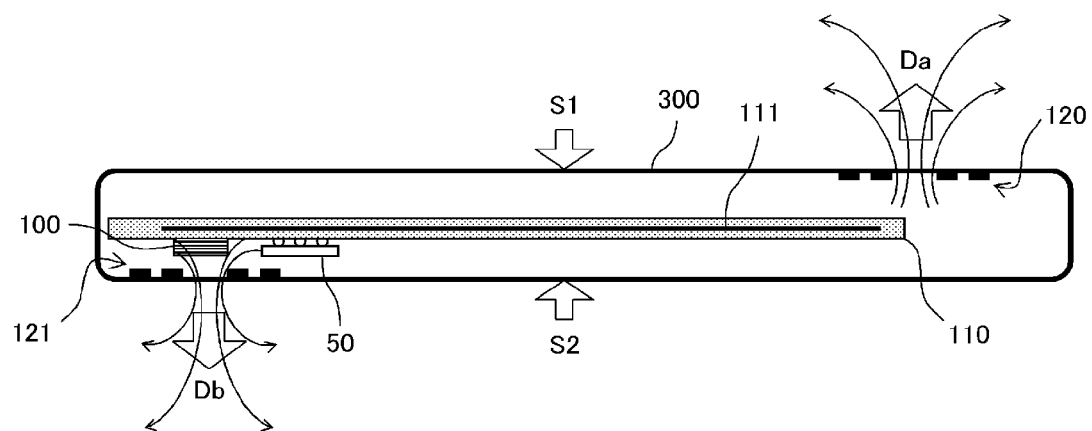
FIG. 13B is a diagram schematically illustrating a situation of magnetic fluxes occurring in the vicinity of an antenna element in the antenna device 308.

FIG. 13A is the cross-sectional view of the main portion of a communication terminal device 308 in an eighth preferred embodiment. FIG. 13B is a diagram schematically illustrating the situation of magnetic fluxes occurring in the vicinity of an antenna element in an antenna device 308.

This eighth preferred embodiment includes the two coiled antenna elements 120 and 121, and the antenna element 121 is disposed at a position at which the antenna element 121 is coupled to the planar conductor 111 through an electromagnetic field generated mainly by the coupling portion CP of the planar conductor 111. The antenna element 120 is disposed at the position of an end portion (the side of the planar conductor, located far away from the coupling portion CP) of the planar conductor 111.

The antenna element 120 is provided on the first surface S1 side of the chassis 300, and the antenna element 121 is provided on the second surface S2 side of the chassis 300. The configuration of the antenna element 120 is preferably the same as the configuration illustrated in FIG. 12A.

As expressed in FIG. 13B, due to the antenna element 120, directivity in an arrow Da direction occurs, and due to the antenna element 121, directivity in an arrow Db direction occurs. Accordingly, even if any one of both surfaces of the chassis 300 faces toward the antenna of a communication partner, it is possible to secure a large maximum communicatable distance. In addition, hot spots occur in the vicinity of both end portions of the chassis 300.

Ninth Preferred Embodiment

Figure 14A:
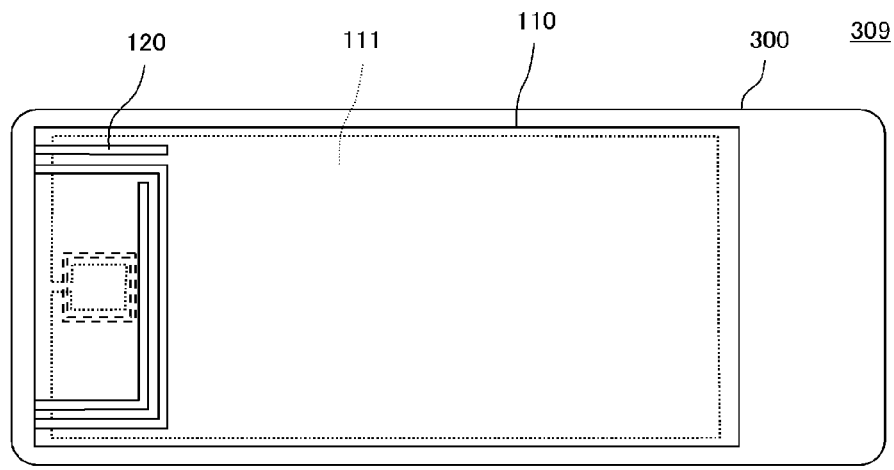
FIG. 14A is a plan view of a communication terminal device 309 according to a ninth preferred embodiment of the present invention.
Figure 14B:
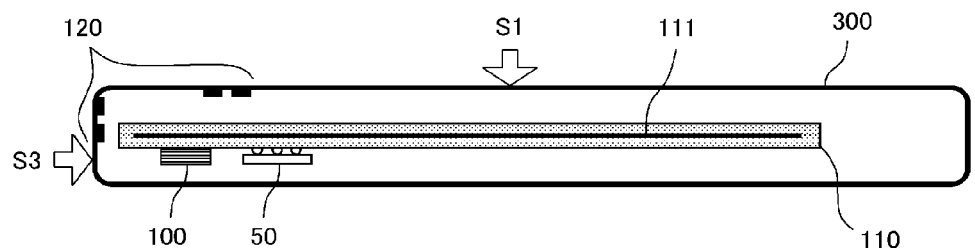
FIG. 14B is a cross-sectional view of a main portion of the communication terminal device 309.
Figure 14C:
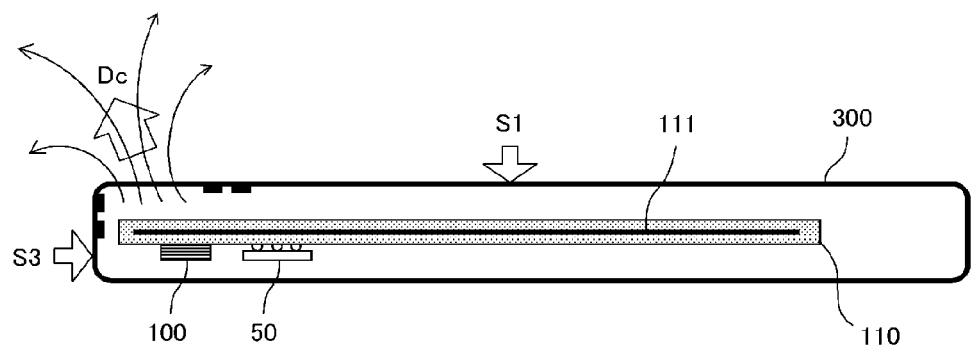
FIG. 14C is a diagram schematically illustrating a situation of magnetic fluxes occurring in the vicinity of an antenna element 120 in an antenna device 309.
Figure 15:
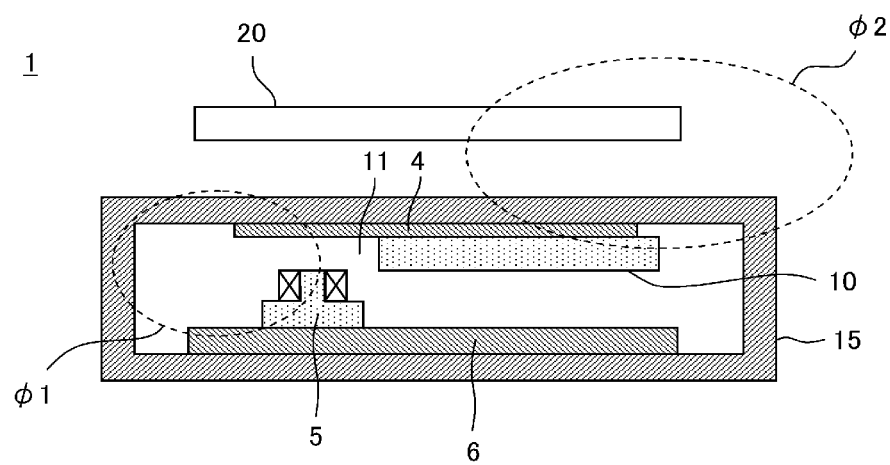
FIG. 15 is a longitudinal cross-sectional view of a contactless IC card reader/writer 1 described in Japanese Patent No. 4325621.

FIG. 14A is the plan view of a communication terminal device 309 according to a ninth preferred embodiment of the present invention. In this regard, however, the first surface (S1 side) of the chassis of the communication terminal device is illustrated in a see-through state. FIG. 14B is the cross-sectional view of the main portion of the communication terminal device 309. FIG. 14C is a diagram schematically illustrating the situation of magnetic fluxes occurring in the vicinity of a coiled antenna element 120 in an antenna device 309.

As for the antenna element 120, the antenna element 120 is disposed (at a position including an edge) along the first surface S1 and the third surface S3 of the terminal chassis 300. The other configuration is preferably the same as the antenna device illustrated in the first preferred embodiment.

In this way, the coil aperture of the antenna element 120 is disposed so as to straddle the two surfaces of the chassis 300, and hence, the directivity of the antenna element 120 is high in an arrow Dc direction (for example, an oblique 45-degree direction). Therefore, it is possible to enlarge a maximum communicatable distance in the arrow Dc direction.

In addition, while, in the examples illustrated in FIGS. 11A, 11B, 13A and 13B, the two antenna elements are preferably provided, three or more antenna elements may also be provided by combining the sixth to ninth preferred embodiments, for example.

In addition, while, in each of the preferred embodiments illustrated above, as an example of the antenna element 120, description has been made of a wire wound antenna that includes a conductor pattern wound in a spiral shape, the antenna element is not limited to a wire-wound type, and may also be an antenna configured using a linear or sheet-shaped radiation electrode.

In addition, a planar conductor according to the present invention is not limited to a ground conductor provided in a substrate. For example, a shield case, a shield plate, or the metal plate portion of a chassis may also be used as a planar conductor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
   a planar conductor;
   a coiled antenna element; and
   a feed circuit coupled to the planar conductor or connected to the planar conductor; wherein
   the antenna element is disposed at a position at which the antenna element is coupled to the planar conductor through an electromagnetic field;

the antenna element is coupled to the feed circuit through the planar conductor; and the antenna element is not directly electrically connected to the feed circuit.

2. The antenna device according to claim 1, wherein a coupling portion of the planar conductor, to which the feed circuit is coupled, is an aperture or a cutout of the planar conductor.

3. The antenna device according to claim 2, wherein the feed circuit includes a feed coil including a coil conductor wound so as to have a coil aperture therewithin, and in a planar view, at least a portion of the coil aperture of the feed coil and a portion of the aperture of the planar conductor overlap with each other.

4. The antenna device according to claim 3, wherein the feed coil is integrated with an RFIC.

5. The antenna device according to claim 3, wherein the antenna element is a coil antenna including a conductor pattern wound so as to have a coil aperture therewithin, and in the planar view, at least a portion of the coil aperture of the feed coil and a portion of the coil aperture of the coil antenna overlap with each other.

6. The antenna device according to claim 2, wherein the antenna element is disposed at a position of the coupling portion.

7. The antenna device according to claim 1, wherein the antenna element is disposed at a position of an end portion of the planar conductor.

8. The antenna device according to claim 1, wherein the antenna element is disposed on both of a first main surface side and a second main surface side of the planar conductor.

9. The antenna device according to claim 1, wherein the antenna element is disposed at positions of a plurality of coupling portions of the planar conductor.

10. The antenna device according to claim 1, wherein the planar conductor is a ground conductor provided with a substrate, and the feed circuit is provided with the substrate.

11. The antenna device according to claim 10, wherein the antenna element is provided on a first main surface side of the substrate, and the feed circuit is provided on a second main surface side of the substrate.

12. The antenna device according to claim 1, wherein the antenna element has a resonant frequency corresponding to a carrier frequency of a communication signal.

13. A communication terminal device comprising:
a substrate;
a planar conductor provided with the substrate;
an antenna element;
a feed circuit coupled to the planar conductor or connected to the planar conductor; and
a chassis; wherein
the planar conductor includes a coupling portion;
the antenna element is disposed at a position at which the antenna element is coupled to the planar conductor through an electromagnetic field, generated by at least the coupling portion of the planar conductor;
the antenna element is coupled to the feed circuit through the planar conductor;
the antenna element is not directly electrically connected to the feed circuit;
the planar conductor is a ground conductor;
the antenna element is provided in the chassis;
the feed circuit is provided on or in the substrate; and
a communication circuit connected to the feed circuit is provided on or in the substrate.

14. The communication terminal device according to claim 13, wherein the coupling portion of the planar conductor is an aperture or a cutout of the planar conductor and the planar conductor is connected to the feed circuit.

15. The communication terminal device according to claim 14, wherein the feed circuit includes a feed coil including a coil conductor wound so as to have a coil aperture therewithin, and in a planar view, at least a portion of the coil aperture of the feed coil and a portion of the aperture of the planar conductor overlap with each other.

16. The communication terminal device according to claim 15, wherein the feed coil is integrated with an RFIC.

17. The communication terminal device according to claim 15, wherein the antenna element is a coil antenna including a conductor pattern wound so as to have a coil aperture therewithin, and in the planar view, at least a portion of the coil aperture of the feed coil and a portion of the coil aperture of the coil antenna overlap with each other.

18. The communication terminal device according to claim 14, wherein the antenna element is disposed at a position of the coupling portion.

19. The communication terminal device according to claim 13, wherein the antenna element is disposed at a position of an end portion of the planar conductor.

20. The communication terminal device according to claim 13, wherein the antenna element is disposed on both of a first main surface side and a second main surface side of the planar conductor.

* * * * *